B. F. HUTCHES, Jr.
ELECTROMOTOR.
APPLICATION FILED JUNE 17, 1910.

1,005,842.

Patented Oct. 17, 1911.

Witnesses:
Katheryne Koch
Daniel Holmgren

Inventor
Benjamin F. Hutches Jr.
By his Attorneys

UNITED STATES PATENT OFFICE.

BENJAMIN F. HUTCHES, JR., OF ALLENDALE, NEW JERSEY.

ELECTROMOTOR.

1,005,842.

Specification of Letters Patent.  Patented Oct. 17, 1911.

Application filed June 17, 1910. Serial No. 567,374.

*To all whom it may concern:*

Be it known that I, BENJAMIN F. HUTCHES, Jr., a citizen of the United States, residing at Allendale, county of Bergen, State of New Jersey, have invented new and useful Improvements in Electromotors, of which the following is a specification.

This invention relates to an electromotor of novel construction, more particularly adapted to be operated with continuous current and pertaining to that class of electromotors which have a stationary central field, and an outer multipolar armature revolving around said field. The electromotor is so constructed that the component parts of the field as well as those of the armature may be readily assembled and taken apart, so that any worn out or otherwise damaged elements may be readily replaced.

Although the construction is more particularly designed for application to motors of comparatively small size, I desire it to be understood that its various novel features may also be embodied in motors of larger sizes.

Figure 2:
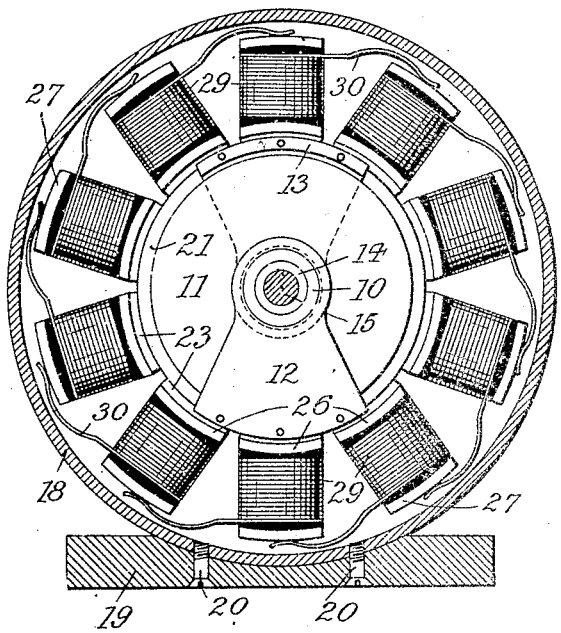
Figure 1:
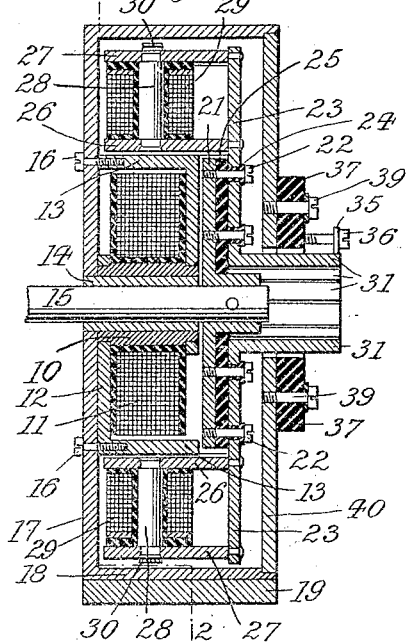
Figure 3:
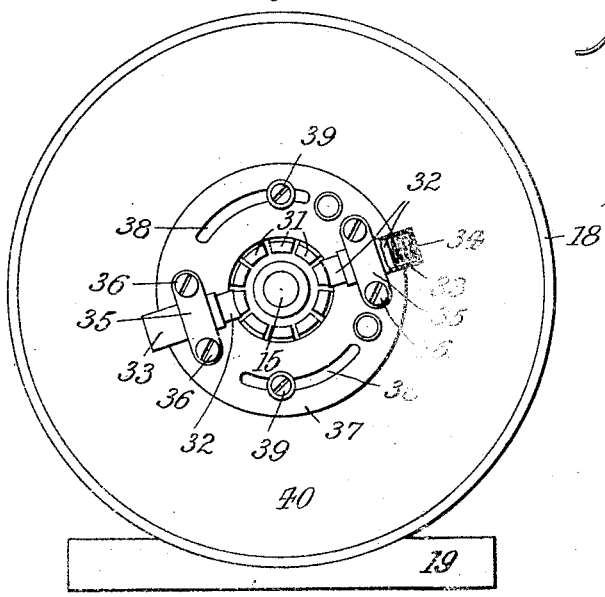
Figures 4, 5:
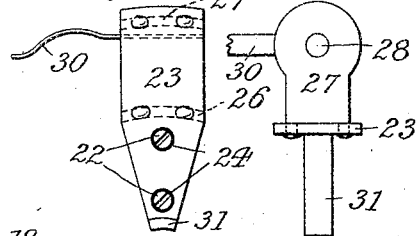
Figure 6:
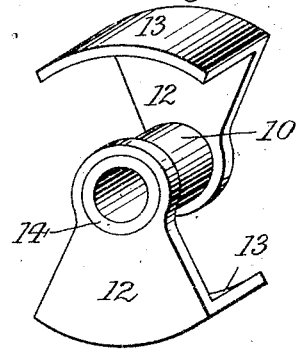

In the accompanying drawing: Figure 1 is a vertical longitudinal central section through an electromotor embodying my invention, Fig. 2 a cross section on line 2—2, Fig. 1, Fig. 3 a right hand end view of the electromotor, Fig. 4 an end view of one of the armature-coil carrying sectors or similar wings, Fig. 5 a top view thereof, and Fig. 6 a perspective view of the field magnet, with the coil omitted.

The bipolar centrally arranged field magnet is composed of a magnetizable core 10, carrying an annular field coil 11. To the reduced ends of core 10 are firmly secured a pair of diametrically opposed L-shaped pole shoes, comprising perforated flaring shanks 12 and outer segments 13 that extend from opposite directions over coil 11. In assembling the parts, coil 11 and shoes 12, 13 are slipped over core 10, whereupon the outer ends of the latter are upset, to prevent a disengagement of the shoes from the core and to simultaneously hold coil 11 in position. Into the bore of core 10 is fitted a bushing 14 which serves as the bearing for the motor-shaft 15. Segments 13 are by screws 16 secured to a plate 17 made of brass or other unmagnetizable material and having a cylindrical flange 18 which is secured to a foot 19 by screws 20.

Shaft 15 carries a comparatively fixed disk or support 21 which is arranged in close proximity to the field magnet hereabove described. To disk 21 are, by screws 22, secured a series of sectors 23 made of conductive material such as brass. In order to properly insulate sectors 23 from each other and from disk 21, screws 22 pass through corresponding insulating bushings 24 of sectors 23, while an insulating plate 25 is interposed between the parts 21, 23. To each sector 23 are riveted or otherwise secured a pair of concentric magnetizable brackets 26, 27 that extend over the field magnet and are connected by a radially extending magnetizable core 28 carrying armature coil 29. One terminal of the latter is permanently connected to core 28, while its other terminal is permanently connected to a contact spring 30, extending laterally from the coil and engaging one of the adjacent outer brackets 27. Each sector 23 is provided at its inner end with a segment 31 extending parallel to shaft 15, segments 31 constituting jointly the commutator.

The commutator brushes consist preferably of carbon blocks 32 loosely mounted in a pair of diametrically opposed boxes 33 and held in engagement with the commutator by springs 34. Boxes 33 are, by clamp plates 35 and screws 36 secured to an insulating ring 37. The latter is slotted as at 38 for the passage of screws 39, adjustably holding the ring to a plate 40, which is firmly driven into a corresponding recess of flange 18.

It will be seen that by the construction described the possibility of the armature coils becoming short-circuited is remote owing to the grounding of said coils, so that the life of the electromotor is considerably prolonged. It will further be observed that all objectionable solder connections between the several armature coils are obviated, so that again sources of possible defects have been eliminated. When assembling the armature parts, the springs 30 will come into contact with the adjacent sectors 23 that are integral with the commutator segments, so that all connections between armature coils and commutator are of the utmost simplicity. If, however, through uncontrollable reasons, one of the coils 29 should become defective, the armature may be readily repaired by simply replacing the injured sector by a new part which may be kept in reserve for this purpose. By using the field magnet as a shaft bearing, space is economized and the assemblage of the parts facilitated.

I claim:—

1. An electromotor comprising a centrally arranged stationary field magnet, a shaft journaled therein, a plurality of wings secured to said shaft, commutator segments integral with the wings, and armature coils carried by the wings.

2. An electromotor comprising a centrally arranged stationary field magnet, a shaft journaled therein, a plurality of insulated wings secured to said shaft, and armature coils carried by the wings.

3. In an electromotor, a support, a plurality of insulated wings secured thereto, armature coils carried by said wings, and means for conductively connecting any one coil with one of the adjacent wings.

4. In an electromotor, a support, a plurality of insulated wings secured thereto, armature coils carried by said wings, one terminal of each coil being conductively connected to its wing while its other terminal is connected to one of the adjacent wings.

5. In an electromotor, a support, a plurality of insulated wings secured thereto, armature coils carried by said wings, and a contact spring conductively connected to each coil and engaging one of the adjacent wings.

6. In an electromotor, a shaft, a support fast thereon, an insulating ring, a plurality of conductive wings, means for securing said ring and wings to the support, and armature coils carried by the wings.

7. In an electromotor, a shaft, a support fast thereon, a plurality of insulated conductive wings secured to the support, brackets fastened to the wings, a core connecting the brackets of each wing, and a coil surrounding each core.

8. In an electromotor, a shaft, a support fast thereon, a plurality of conductive wings secured to and insulated from the support, brackets fastened to the wings, a core connecting the brackets of each wing, a coil surrounding each core, and a spring conductively connected to each coil and engaging one of the adjacent brackets.

9. In an electromotor, a centrally arranged field magnet comprising a tubular core, a pair of opposed L-shaped pole shoes secured thereto, and an annular field coil encircling the core and accommodated between the pole shoes, combined with a shaft journaled in the core, a plurality of insulated conductive wings secured to the shaft, commutator segments integral with the wings, armature coils carried by the wings, and contact springs that connect any one coil with one of the adjacent wings.

BENJAMIN F. HUTCHES, Jr.

Witnesses:
FRANK V. BRIESEN,
ARTHUR E. ZUMPE.